Aug. 11, 1936.  L. A. CARTER  2,050,520

CHANGE SPEED TRANSMISSION

Filed Nov. 8, 1935  8 Sheets-Sheet 1

INVENTOR:
Lionel A. Carter
by his attorneys

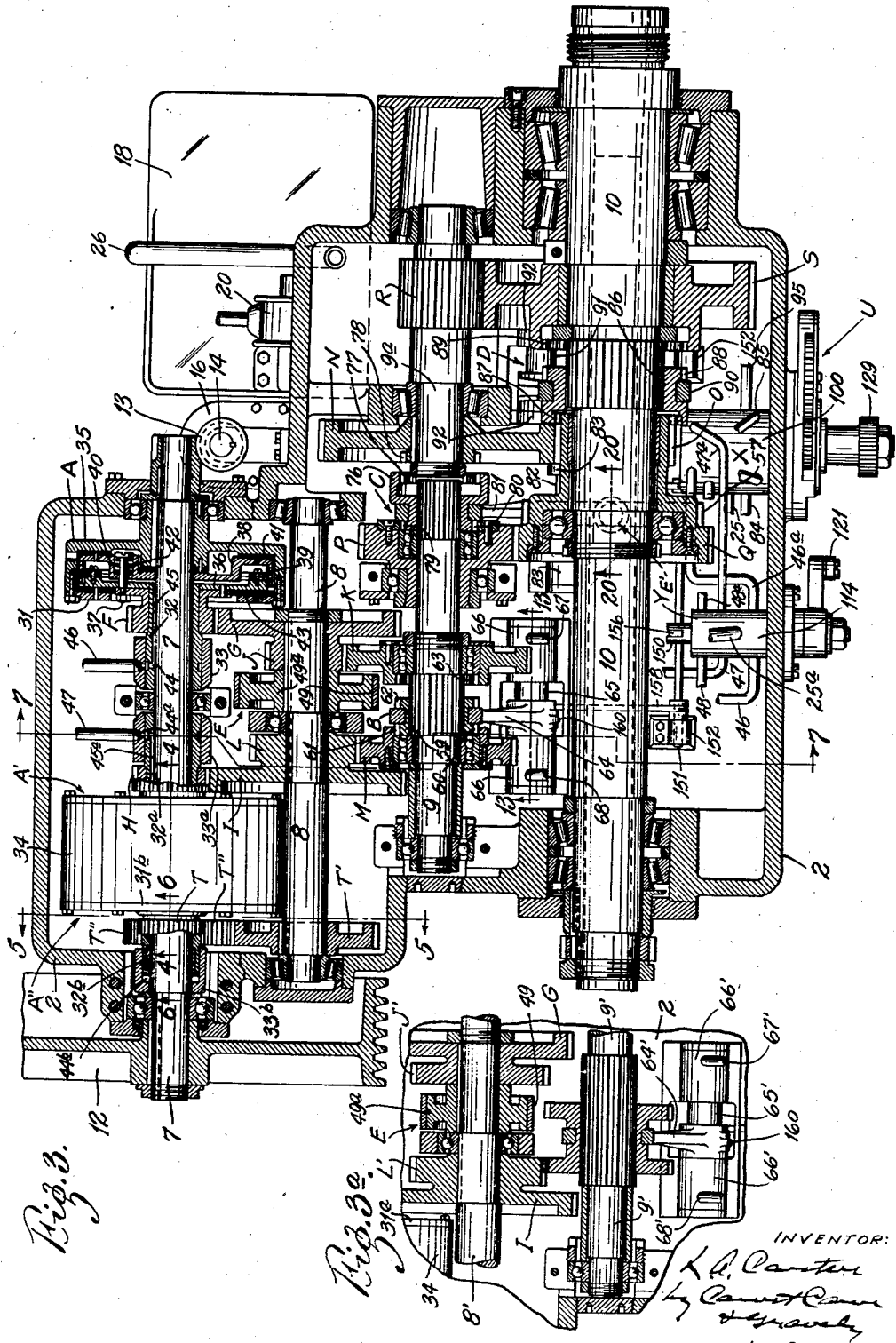

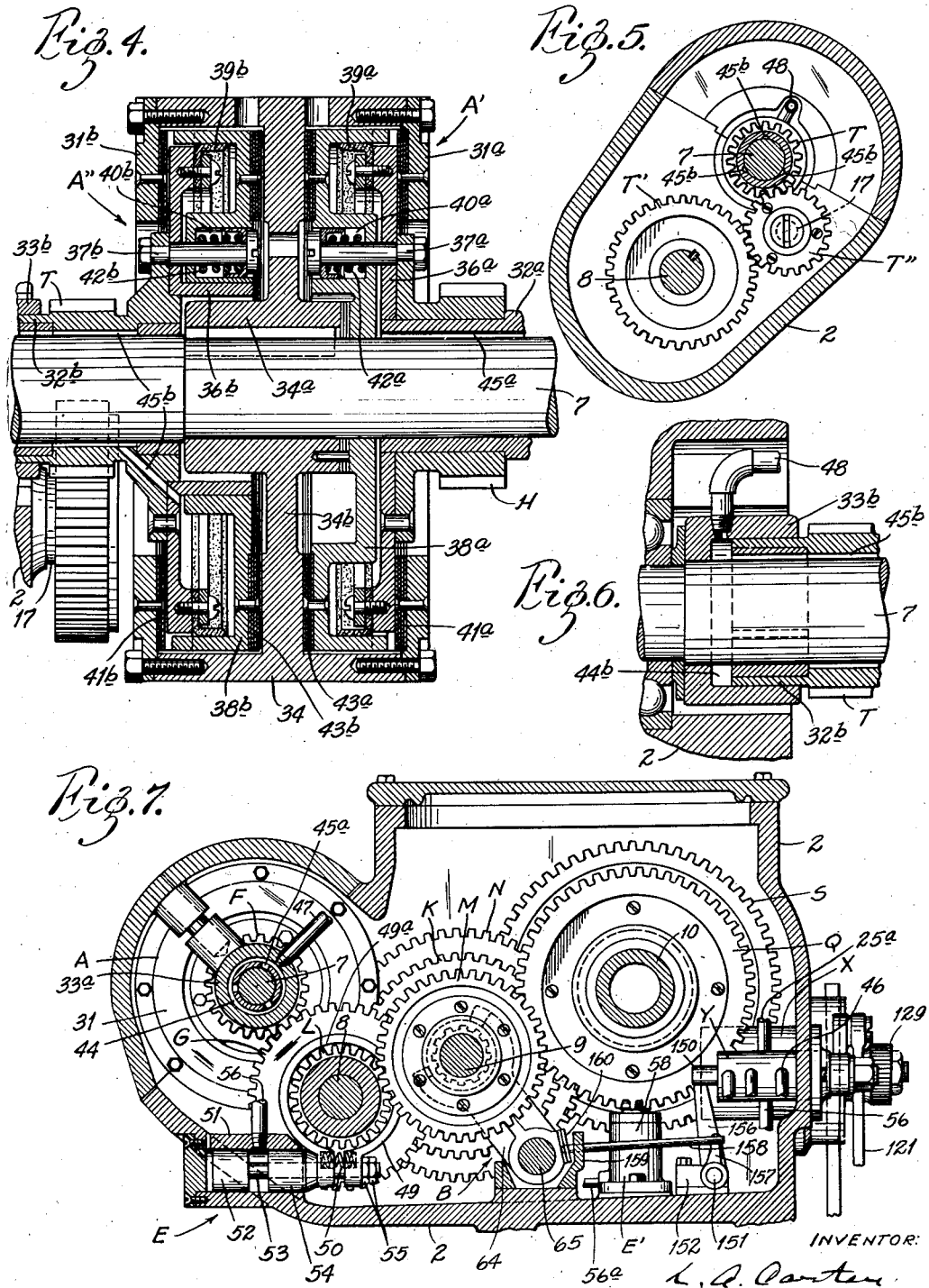

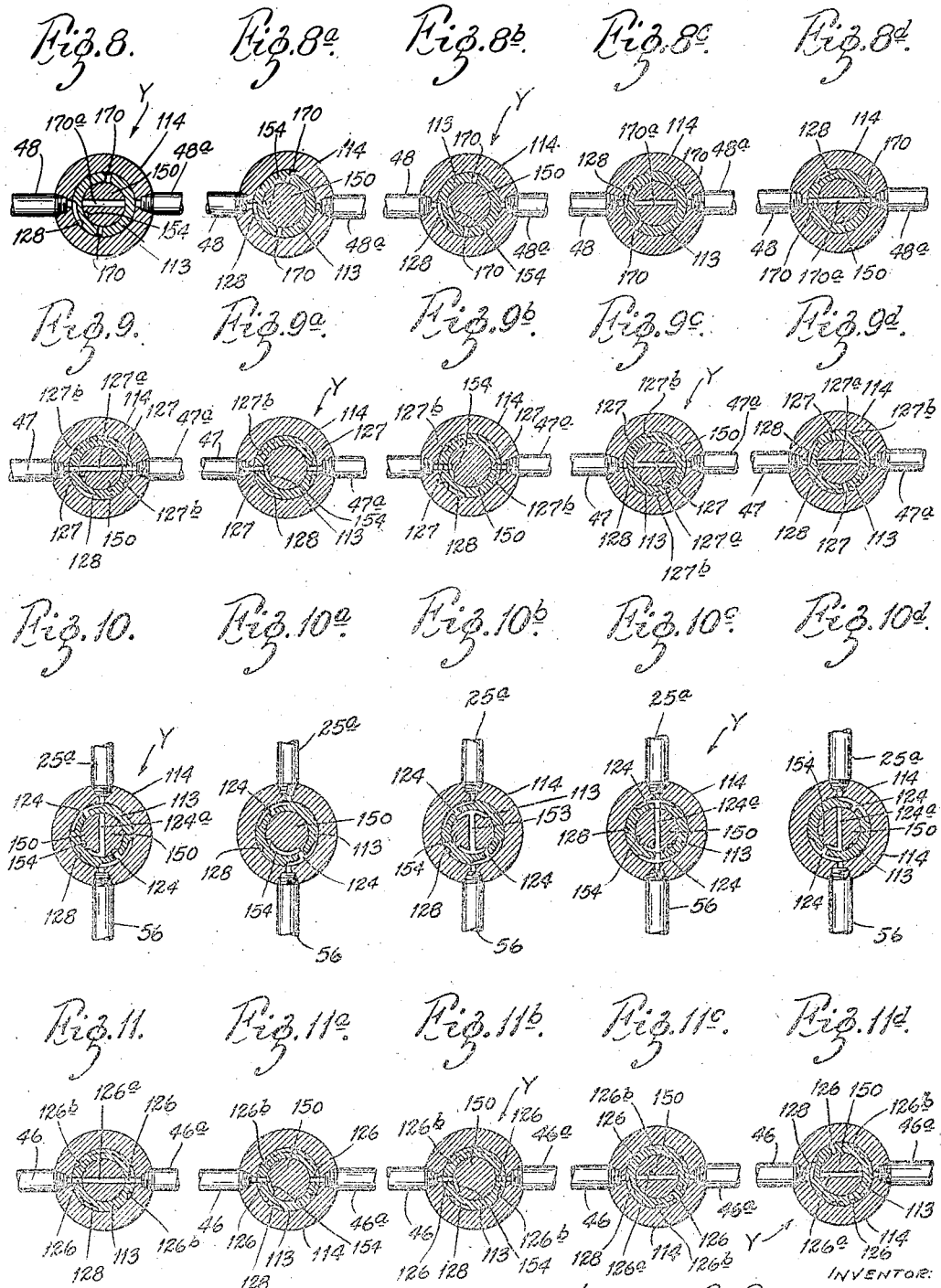

Aug. 11, 1936.    L. A. CARTER    2,050,520
CHANGE SPEED TRANSMISSION
Filed Nov. 8, 1935    8 Sheets-Sheet 5
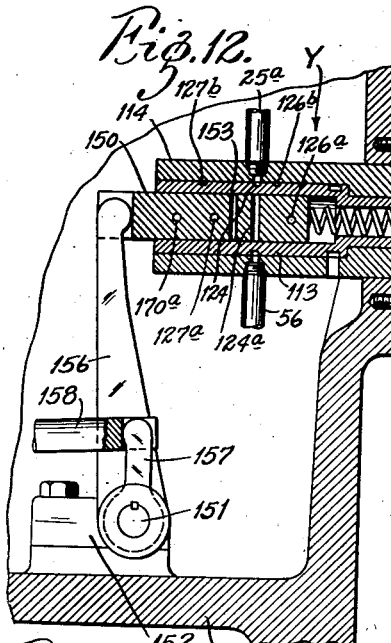
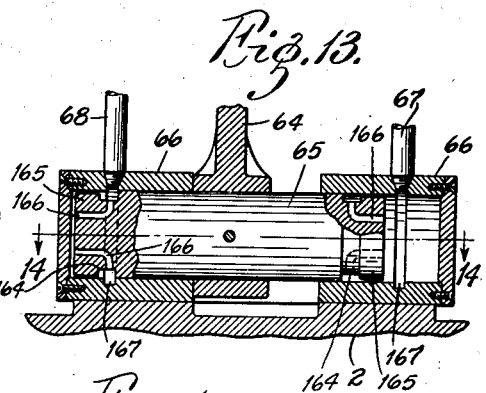
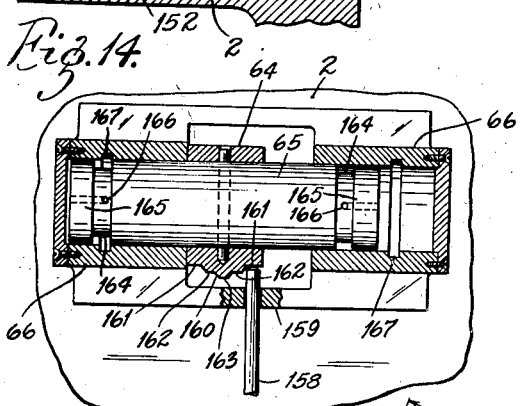
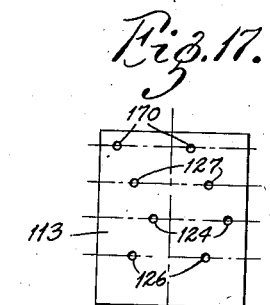
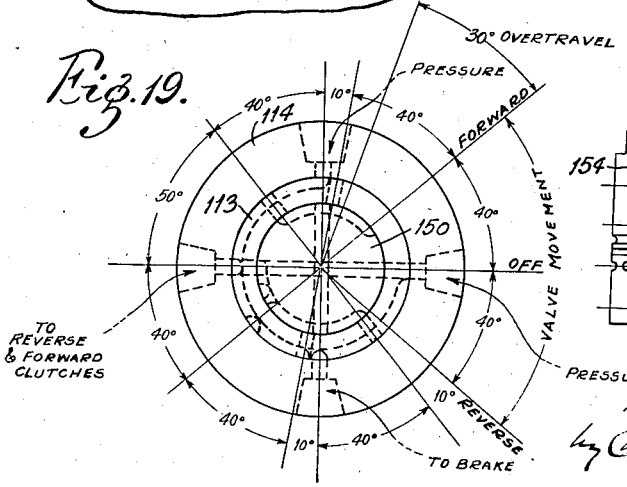
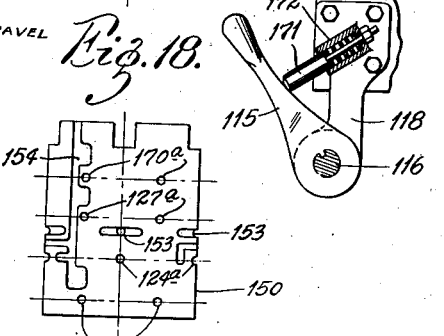
INVENTOR:
Lionel A. Carter
by Carrot Carrot Gravely
HIS ATTORNEYS

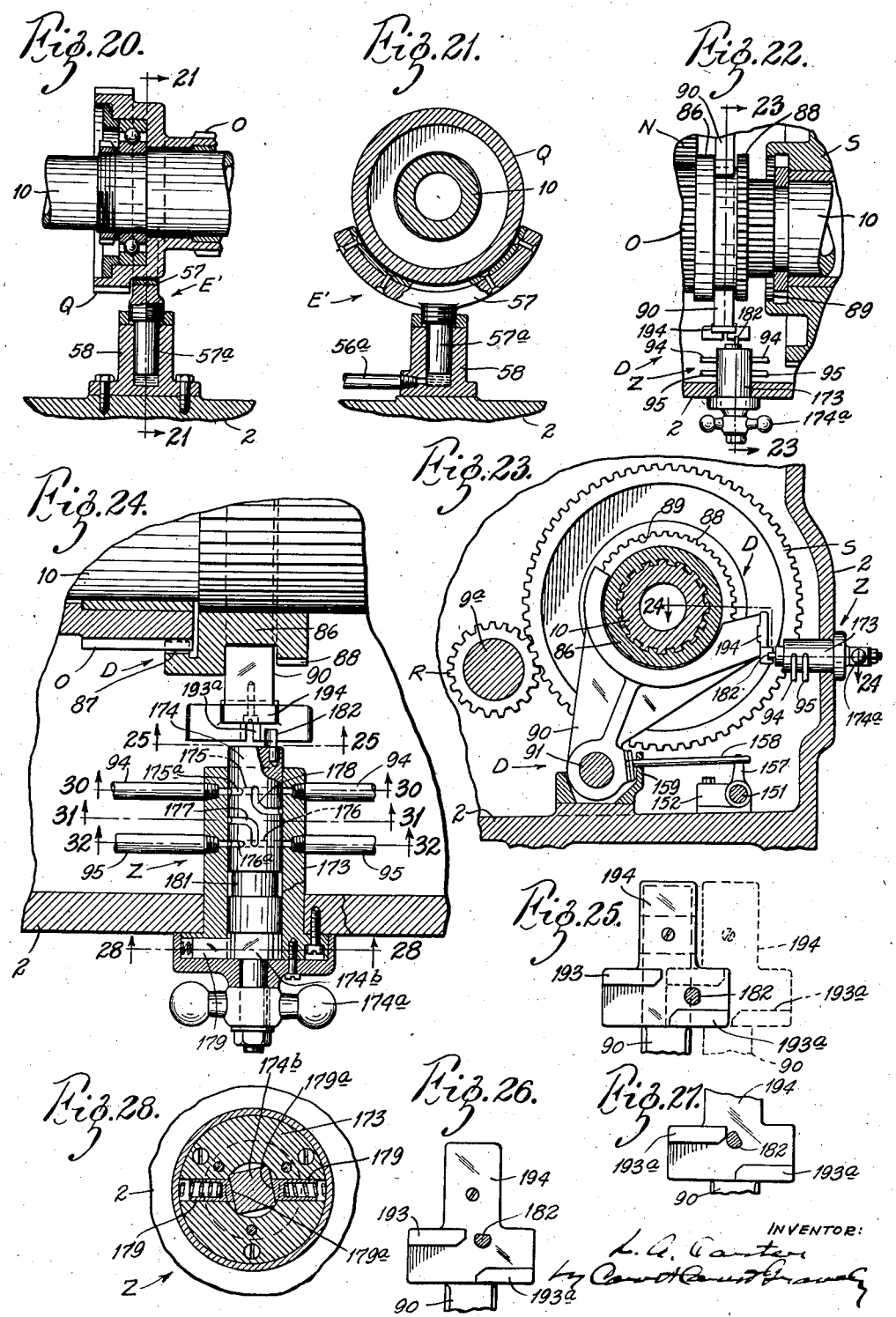

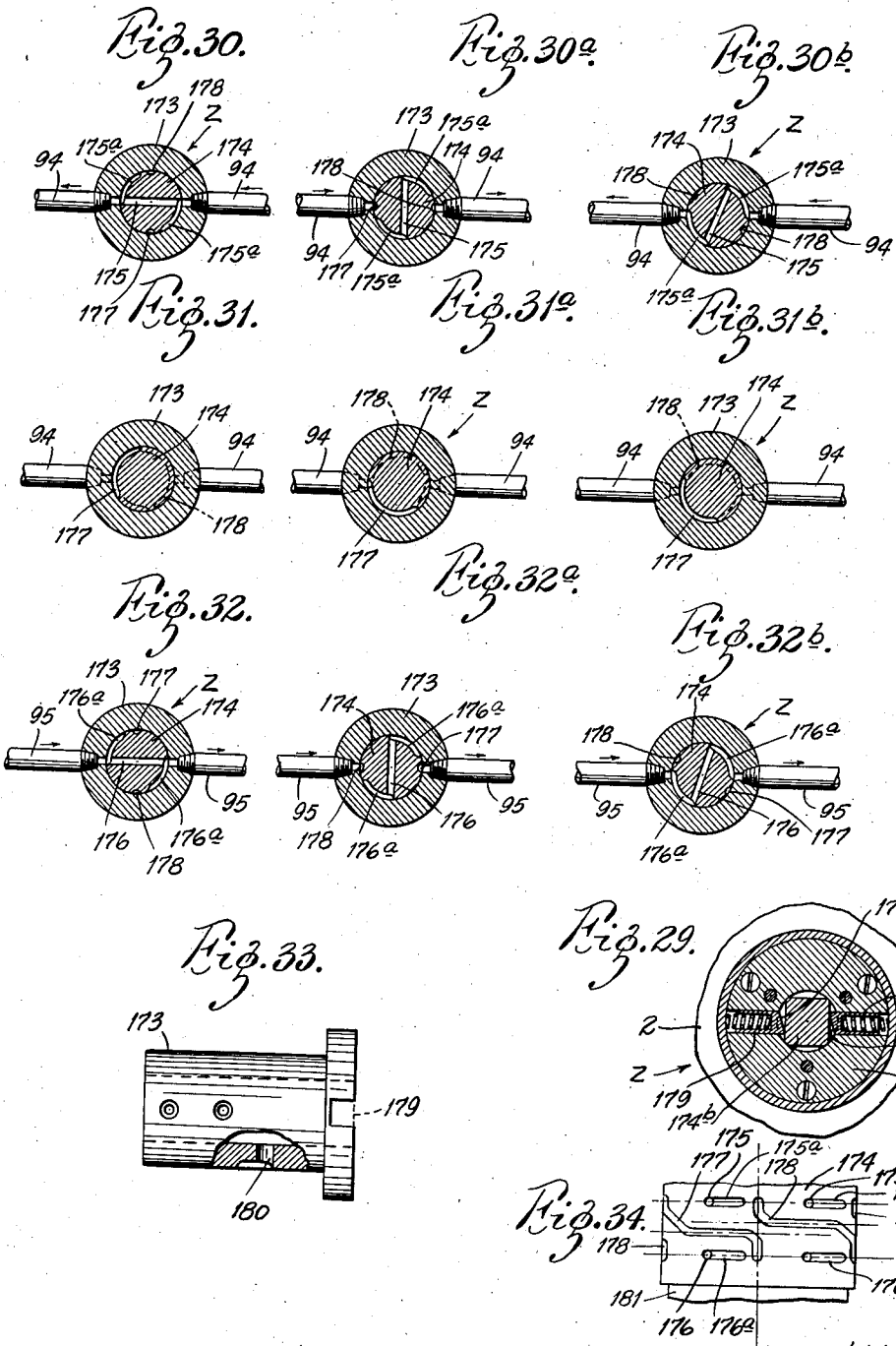

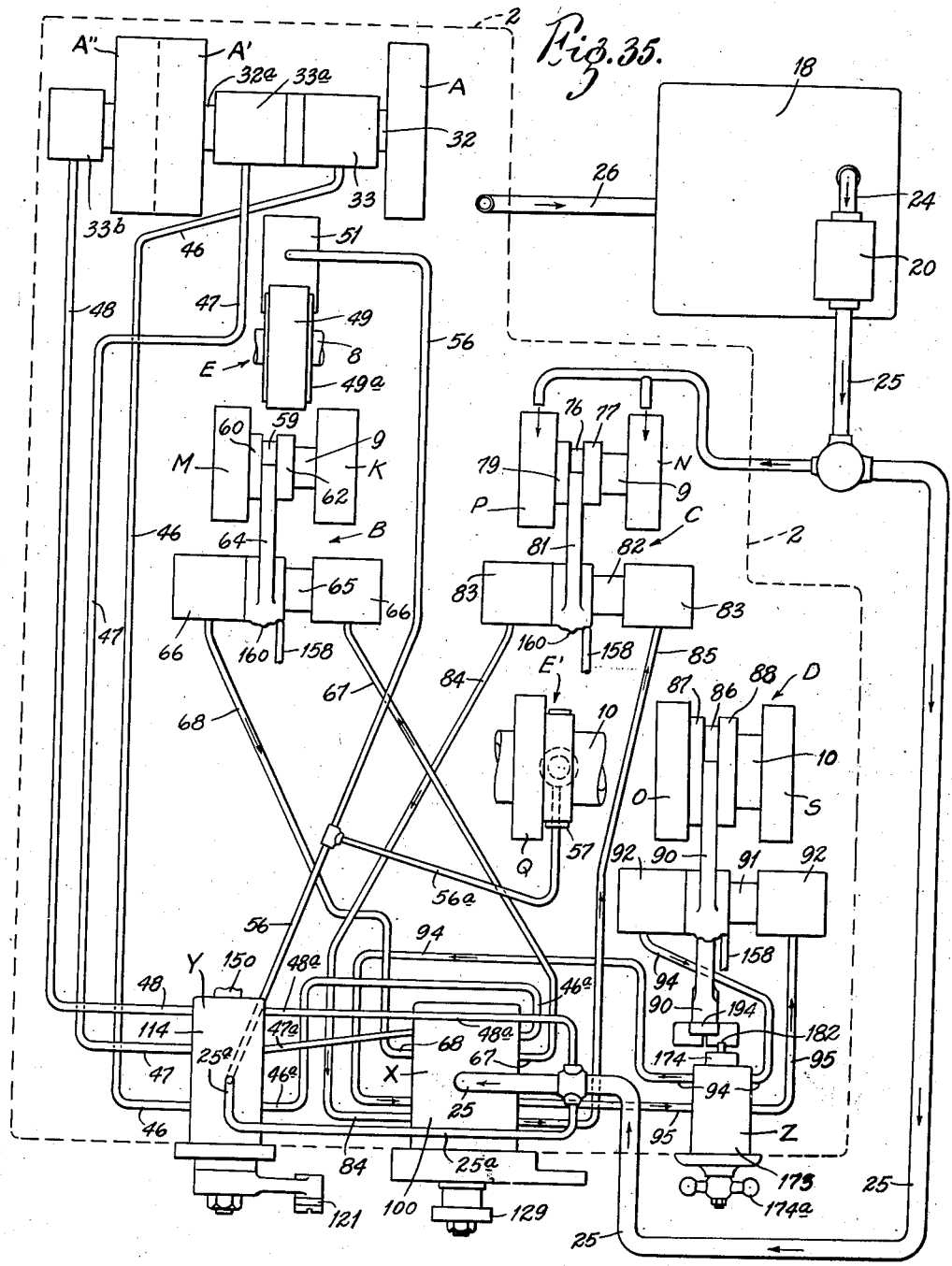

Patented Aug. 11, 1936

2,050,520

UNITED STATES PATENT OFFICE 2,050,520

CHANGE SPEED TRANSMISSION

Lionel A. Carter, Webster Groves, Mo.

Application November 8, 1935, Serial No. 48,921

29 Claims. (Cl. 192—12)

This invention relates to change speed mechanisms, particularly change speed mechanisms of the kind shown and claimed in my pending applications Serial No. 721,974 filed April 23, 1934 and Serial No. 24,313 filed May 31, 1935, wherein the desired selected speed changes are obtained by fluid operated clutches controlled by a single manually operated valve, a second manually operated valve is provided for starting and stopping said mechanism, and a third manually operable valve is provided for releasing the final drive shaft to enable it to be rotated independently of the other shafts of said transmission mechanism.

The present invention has for its principal objects to preserve all of the advantages of the above type of fluid operated change speed transmission and, at the same time, to provide a plurality of reverse speed changes without increasing the number of shafts in said mechanism and without material alterations of the transmission mechanism or increase in the size thereof, to provide a brake for preventing overrunning of the final drive shaft when the clutches are disengaged, to provide means for bringing the elements of the positive clutches into position for proper engagement, and to provide improved means for disconnecting the final drive shaft from the driving mechanism therefor so that said shaft may be readily rotated by hand. Other objects are simplicity and cheapness of construction and compactness of design. The invention consists in the change speed transmission and in the construction, combinations and arrangements of parts hereinafter described and claimed.

In the accompanying drawings, which form part of this specification and wherein like symbols refer to like parts wherever they occur, Fig. 1 is a front view of a portion of a lathe having a geared headstock provided with a fluid-operated change speed transmission embodying my invention;

Fig. 2 is a fragmentary horizontal section through the front wall of the headstock, the section being taken through the control valve and the stop, start and reverse valve on the line 2—2 in Fig. 1, Fig. 3 is a horizontal section through the headstock approximately on the line 3—3 in Fig. 1, Fig. 3a is a fragmentary horizontal section similar to Fig. 3, showing a modified arrangement for obtaining the speed changed by means of sliding gears instead of clutches;

Fig. 4 is an enlarged central longitudinal section on the line 4—4 in Fig. 3 through the housing for the low speed forward drive clutch and the reverse drive clutch;

Fig. 5 is a vertical cross-section on the line 5—5 in Fig. 3, showing the reverse drive gearing, Fig. 6 is a fragmentary vertical longitudinal section on the line 6—6 in Fig. 3, Fig. 7 is a fragmentary vertical transverse section on the line 7—7 in Fig. 3;

Figs. 8, 8a, 8b, 8c and 8d are transverse sections through the stop, start and reverse valve, the sections being taken on the line 8—8 in Fig. 2 through the pipes leading to the reverse drive clutch, the valve being shown in forward drive position in Figs. 8, 8a and 8b with its core in different positions of its longitudinal movement, in stop position in Fig. 8c, and in reverse drive position in Fig. 8d;

Figs. 9, 9a, 9b, 9c and 9d are similar transverse sections through said valve, the sections being taken along the line 9—9 in Fig. 2 at the points of communication between said valve and the pipes leading to the low speed forward clutch;

Figs. 10, 10a, 10b, 10c and 10d are similar cross-sections through said valve, the sections being taken on the line 10—10 through the points of communication between said valve and the pipes leading to the brakes for the primary drive shaft and the spindle;

Figs. 11, 11a, 11b, 11c and 11d are similar cross-sections, taken along the line 11—11 in Fig. 2 at the points of communication between said valve and the pipes leading to the high speed forward drive clutch;

Fig. 12 is a vertical cross-section through the lower front portion of the headstock housing of the section and being taken longitudinally of the stop, start and reverse valve on the line 12—12 in Fig. 2;

Fig. 13 is a vertical longitudinal section through the operating cylinders of one of the positive clutches on the line 13—13 in Fig. 3;

Fig. 14 is a horizontal longitudinal section on the line 14—14 in Fig. 13;

Fig. 15 is a vertical cross-section on the line 15—15 in Fig. 1, showing the yieldable stop for permitting overthrow of the control handle for the start, stop and reverse valve;

Fig. 16 is a diagrammatic view showing a development of the outer peripheral surface of the rotary sleeve of said valve;

Fig. 17 is a similar view showing a development of the inside surface of said rotary valve sleeve;

Fig. 18 is a diagrammatic view showing the development of the outer peripheral surface of the axially slidable core of said valve;

Fig. 19 is a diagrammatic view showing the angular movement of said valve sleeve in the off, forward, over-travel and reverse positions thereof;

Fig. 20 is a vertical longitudinal section through the spindle and the brake mechanism therefor;

Fig. 21 is a vertical cross-section on the line 21—21 in Fig. 20;

Fig. 22 is a horizontal section on the line 22—22 in Fig. 1, showing the spindle release mechanism;

Fig. 23 is a vertical cross-section on the line 23—23 in Fig. 22;

Fig. 24 is a horizontal section on the line 24—24 in Fig. 23;

Figure 1:
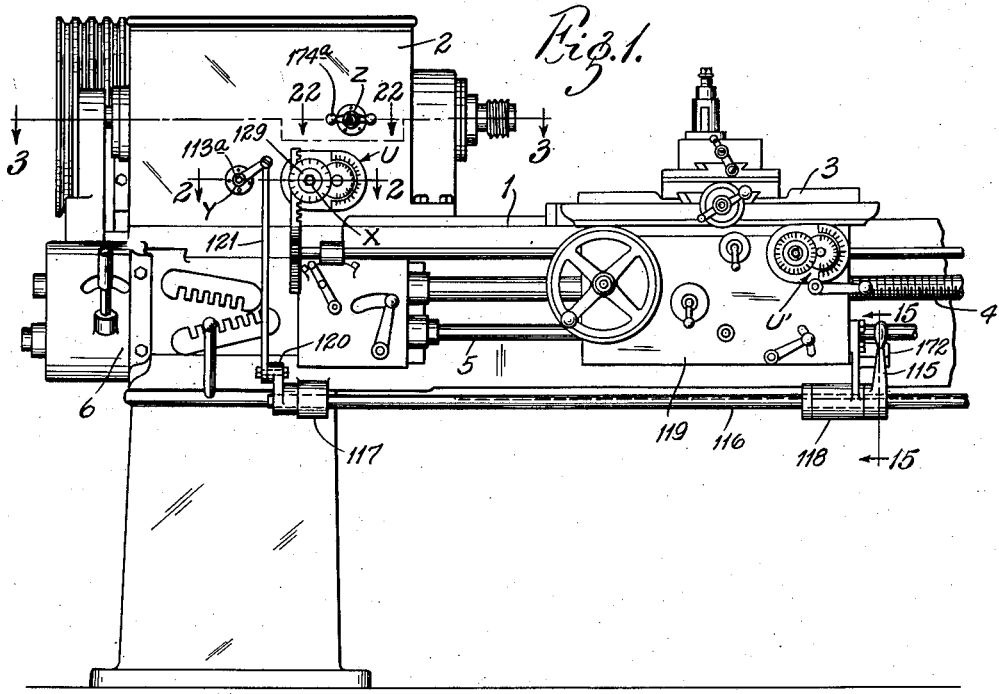

Figs. 25, 26 and 27 are vertical cross-sections on the line 25—25 in Fig. 24, Fig. 25 showing the positions of the parts in inoperative position of the spindle release valve and Figs. 26 and 27 showing the position of said parts in the operative position of said valve;

Fig. 28 is a vertical cross-section through the squared portion of the core of the spindle release valve on the line 28—28 in Fig. 24;

Fig. 29 is a similar section showing the position of the parts during the overtravel of the rotary valve core;

Figs. 30, 30a and 30b are vertical cross-sections through the spindle release valve, the sections being taken along the line 30—30 in Fig. 24 through the points of communication of said valve with the pipe leading to one of the cylinders of the spindle drive clutch, Fig. 30 showing the valve in inoperative position, Fig. 30a showing the valve in operative position and Fig. 30b showing the valve moved beyond said last mentioned position by the overtravel of the clutch sleeve during its movement to neutral position;

Figs. 31, 31a, and 31b are similar views taken through a portion of the by-pass ports of said valve on the line 31—31 in Fig. 24;

Figs. 32, 32a and 32b are similar cross-sections taken on the line 32—32 in Fig. 24 at the points of communication between said valve and the pipes leading to the other operating cylinder of the spindle clutch;

Fig. 33 is a side elevation partly in section of the casing of said spindle release valve;

Fig. 34 is a diagrammatic view showing a development of the outer peripheral surface of the rotary core of said spindle release valve; and Fig. 35 is a diagrammatic view illustrating the connections between the valves and clutches of the fluid operated change speed transmission.

In the accompanying drawings, the present invention is illustrated in connection with a fluid operated change speed transmission of the kind shown in my pending applications Serial Nos. 721,974 and 24,313 and embodied in the geared headstock of an engine lathe comprising a bed 1, a headstock housing 2, a carriage 3, a lead screw 4, a feed rod 5 and a housing 6 containing a quick change mechanism (not shown) for driving said lead screw and said feed rod at different selected speeds.

The change speed mechanism enclosed within the headstock housing 2 comprises four horizontally spaced parallel shafts; namely, a main or primary drive shaft 7, a countershaft 8, a second countershaft comprising sections 9 and 9a, and a final driven shaft or spindle 10, which carries at its forward end the usual chuck or face plate (not shown) for supporting the work or stock that is to be operated upon. The drive shaft 7 is provided at its rear end with a drive pulley 12 and its forward end is operatively connected by gearing 13 to a vertical shaft 14 that is connected by gearing enclosed in a housing 16 with a rotary pump 20 mounted on a lubricant supply tank 18 located below the headstock housing 2. As shown in Fig. 35, a pipe 24 leads from the bottom of the tank 18 to the pump 20, a pipe 25 leads from said pump for supplying lubricant to the headstock housing 2 and to various pressure responsive devices hereinafter described, and an overflow pipe 26 leads from the lower portion of said housing to said tank for returning the lubricant thereto.

The gearing of the change speed transmission mechanism comprises gears F and H fixed to the remote ends of a pair of sleeves 32 and 32a that surround the primary or main drive shaft 7 and are mounted for independent rotary and axial sliding movement in fixed bearings 33 and 33a. The gears F and H intermesh continuously with gears G and I, respectively, fixed to the countershaft 8. Gears L and J are also fixed to the countershaft 8 and intermesh continuously with gears M and K, respectively, journaled on the rear section 9 of the sectional countershaft. A third gear P is mounted for rotation on the rear section 9 of the sectional countershaft and intermeshes continuously with a gear Q rotatable on the spindle 10. Gears N and R are fixed to the forward section 9a of the sectional countershaft and intermesh continuously with gears O and S, respectively rotatable on the spindle 10. As shown in the drawings the gears O and Q are integrally connected to constitute a double gear. The gearing thus far described provides sixteen forward speeds. Eight reverse speeds are obtained by a reverse gear train (Fig. 5) between the drive shaft 7 and the countershaft 8 comprising a gear T on said drive shaft, a gear T' on said countershaft and a gear T'' intermeshing continuously with the gears T and T' and mounted on a stub shaft 17 supported on the rear end wall of the headstock housing 2. As shown in Fig. 3 the drive shaft gear T has an elongated hub 32b mounted for rotary and axial sliding movement in a bearing 33b mounted in the rear end wall of the housing 2.

The change speed transmission is provided with three primary clutches, a high speed forward drive clutch A, a low speed forward drive clutch A' and a reverse drive clutch A'', and three secondary clutches B, C and D all adapted to be selectively operated by fluid pressure under manual control to obtain the desired spindle speeds. As shown in said application Serial No. 721,974, the primary clutches A, A' and A'' are friction disk clutches and the secondary clutches B, C and D are interlocking or positively engaged clutches. The gears F and H are selectively coupled to the drive shaft 7 for rotation therewith by means of the forward drive friction disk clutches A and A', respectively, and the gear T is coupled to said drive shaft by the reverse drive friction disk clutch A'', the three clutches being substantially the same in their construction and operation.

The high speed, forward drive, friction clutch A comprises a cup-shaped clutch element 35, which is fixed to the drive shaft 7 and has an annular plate 31 secured into the outer end of its peripheral flange, a clutch element or disk 36, which is secured by bolts 37 to an outstanding flange on the adjacent end of the sleeve supported gear F for rotary and axial sliding movement therewith, and a circumferentially flanged clutch element or disk 38, which is slidably and rotatably mounted on said drive shaft and is connected by said bolts to the clutch element 36 for rotation therewith and for axial sliding movement relative thereto. The clutch disks 36 and 38 are enclosed within the continuously rotating cup shaped clutch element 35; and the disk 36 has a cup leather 39 secured thereto that fits within the circumferential flange of the disk 38 to prevent loss of pressure between the outer edges of said disks. The bolts 37 have their head ends located in pockets or recesses 40 provided therefor in the circumferentially flanged clutch disk 38 and extend through alined holes in the bottoms of said pockets, the disk 36, and the outstanding flange on the adjacent end of the sleeve supported gear F. Springs 42 are sleeved on the bolts 37 between the bottoms of said pockets and the heads of said bolts therein and operate to move the disks 36 and 38 towards each other into inoperative position. The clutch disk 38 is provided with a suitable clutch facing material 41 adapted to frictionally engage the end wall of the continuously rotating clutch element 35, the threaded annular plate 31 of which has a similar clutch facing material 43 secured thereto adapted to be frictionally engaged by the clutch disk 36.

The portion of the gear supporting sleeve 32 that is located in the bearing 33 is provided on its exterior surface with an annular groove, forming a chamber 44 whch communicates with the space between the clutch disks 36 and 38 through a series of circumferentially spaced longitudinal grooves 45 formed in the bore of said sleeve. Oil is supplied to the high speed, forward drive, friction disk clutch A through a pipe 46 that leads to the chamber 44 of said clutch. By this arrangement, when the oil is forced into the chamber 44, it flows through the longitudinal passageways 45 into the space between the two clutch disks 36 and 38 and forces them apart into frictional engagement with the clutch member 35 fixed to the drive shaft 7 thereby causing the gear F of that clutch to rotate with said shaft and rotate the gear G fixed to the counter-shaft 8. When the pressure is relieved, the springs 42 operate to disengage the clutch disks 36 and 38 from the clutch element 35.

The low speed, forward drive, friction disk clutch A' is mounted in one end of a hollow cylindrical housing or clutch element 34 having a hub 34a keyed to the drive shaft 7 and connected to the cylindrical outer wall of said housing by a radial web or partition 34b located midway between the ends thereof. An annular plate 31a is removably secured to said end of the clutch housing 34, a clutch element or disk 36a is secured by bolts 37a to the outstanding flange on the adjacent end of the sleeve supported gear H, and a circumferentially flanged clutch element or disk 38a is connected by said bolts to the clutch element 36a. The clutch element or disk 36a has a cup leather 39a secured thereto that engages the peripheral flange of the disk 38a to prevent loss of pressure between the outer edges of said disks. The bolts 37a have their head ends located in pockets 40a provided therefor in the clutch disk 38a and extend through alined holes in said pockets, the disk 36a and the outstanding flange on the adjacent end of the sleeve supported gear H. Springs 42a are sleeved on the bolts 37a between the bottoms of the pockets 40a and the heads of the bolts therein and operate to force the disks 36a and 38a toward each other into inoperative position. The clutch disk 38a and the annular plate 31a are provided with suitable clutch facing material 41a and 43a, respectively. As shown in Fig. 3, the portion of the gear supporting sleeve 32a supported in the bearing 33a is provided on its exterior surface with an annular groove, forming a chamber 44a which communicates with the space between the clutch disks 36a and 38a of the low speed forward drive clutch A' through a series of longitudinal grooves 45a in the bore of said sleeve. Oil is supplied to the chamber 44a of the clutch A' through a pipe 47 and thence flows through the grooves 45a into the space between the two clutch disks 36a and 38a and forces them apart into engagement with the web 34b of the clutch housing 34 and the annular plate 31a thereof.

The reverse drive clutch A'' is mounted in the other end of the clutch housing 34 and comprises a clutch element or disk 36b secured by bolts 37b to the outstanding flange on the adjacent end of the hub of the gear T, and a circumferentially flanged clutch element or disk 38b interposed between the clutch element 36b and the web 34b of said housing. The clutch disk 36b cooperates with an annular plate 31b, which is removably secured to the end of said housing and is provided on its inner face with a suitable clutch facing material 43b, and the clutch element 38b is provided with a similar clutch facing material 41b adapted to engage the web 34b of said housing. The disk 36b has a cup leather 39b secured thereto that engages the circumferential flange of the clutch disk 38b and serves to prevent loss of pressure between the outer portions of said disks. The bolts 37b have their head ends located in annularly spaced pockets 40b in the clutch disk 38b and extend through alined holes in said pockets, the disk 36b and the outstanding flange on the gear T. The disks 36b and 38b are held in inoperative position by means of springs 42b sleeved on the bolts between the heads thereof and the bottoms of the pockets 40b in the disk 38b. The hub 32b of the gear T terminates short of the bearing 33b therefor, forming an annular chamber 44b which communicates with the space between the clutch disks 36b and 38b through a series of longitudinal grooves 45b formed in the bore of said gear hub. Oil is supplied to the chamber 44b through a pipe 48 and thence flows through the longitudinal passageways 45b into the space between the two clutch disks 36b and 38b, forcing them apart into engagement with the partition web 34b and the annular end plate 31b, respectively, of the clutch housing 34.

As shown in Figs. 3 and 7, the primary countershaft 8 is provided with a fluid operated brake mechanism E comprising a split brake band 49 adapted to frictionally engage the periphery of a wheel 49a fixed to said shaft between the gears J and L thereon. The brake band 49 is normally held in released position by means of a coil spring 50 interposed between the split ends thereof and is applied by means of a double piston mounted in a cylinder 51 formed integral with the headstock housing 2. One member 52 of this double piston is provided with a rod 53 which extends through the other member 54 thereof and through alined openings provided therefor in the ends of the brake band 49 and is provided at its end with nuts 55. Pressure exerted by the spring 50 forces the pistons 52 and 54 toward each other and spreads the brake band, thereby releasing the brake. Oil is supplied to the cylinder 51 between the adjacent inner ends of the pistons 52 and 54 by means of a pipe 56, thereby forcing said pistons apart and thus causing the brake band 49 to grip the collar 48 fixed to the primary countershaft 8 and thus stop rotation thereof.

As shown in Figs. 20 and 21, the final drive shaft or spindle 10 is provided with a fluid operated brake mechanism E' comprising an arcuate brake shoe 57 adapted to engage the underside of the double gear O, Q, between the two gears thereon. Said shoe is supported on the upper end of a piston 57a mounted for vertical movement in an upright cylinder 58 secured to the bottom of the headstock housing 2. Oil is supplied to the lower end of said cylinder to raise the piston therein, and thus force the brake shoe 57 into engagement with the underside of the double gear O, Q, through a branch 56a of the pipe 56 that leads to the cylinder 51 for operating the primary shaft brake E.

As shown in Fig. 3, the gears M and K are selectively clutched to the rear countershaft section 9 to rotate the same by the fluid operated positive clutch mechanism B which comprises a clutch sleeve 59 that is slidably splined on said shaft intermediate between said gears. The sliding clutch member 59 is provided on the end nearest the gear M with external clutch teeth 60 adapted to cooperate with internal clutch teeth 61 formed on said gear; and the other end of said clutch member is likewise provided with external clutch teeth 62 adapted to engage internal clutch teeth 63 on the gear K. As shown in Figs. 3, 13 and 14, the sliding clutch member 59 is actuated by means of a shifter fork 64 having its hub fixed to a piston 65 whose ends are slidably supported in cylinders 66. As shown in Fig. 35, the clutch 59 is shifted into engagement with the gear M by oil supplied through a pipe 67 to the inner end of the right hand cylinder; and oil supplied to the left hand cylinder through a pipe 68 shifts said clutch into engagement with the gear K.

As shown in Fig. 3, the two sections 9 and 9a of the sectional countershaft are connected to rotate together by means of the fluid operated clutch mechanism C, which comprises a clutch sleeve 76 that is slidably splined on the forward end of the rear section 9 of said shaft between the gears P and N. This sliding clutch member is provided at its forward end with internal clutch teeth 77 adapted to be engaged with external clutch teeth 78 formed on the gear N; and the rear end of said clutch member is provided with external clutch teeth 79 adapted to be clutched with internal clutch teeth 80 formed in the gear P. The clutch 76 is operated by a shifter fork 81 fixed to a piston 82 whose ends are mounted in cylinders 83 located in the bottom of the headstock housing. As shown in Fig. 35, said clutch is shifted into engagement with gear N by means of oil supplied to the left-hand cylinder through a pipe 84 and is shifted into engagement with the gear P by oil supplied to the right-hand cylinder through a pipe 85.

As shown in Fig. 3, the fluid operated clutch mechanism D comprises a clutch sleeve 86, which is slidably splined on the spindle 10 between the double gear O, Q and the gear S, and is provided at its rear end with internal clutch teeth 87 adapted to engage the gear O and at its forward end with external clutch teeth 88 adapted to interlock with internal clutch teeth 89 formed on the gear S. The clutch sleeve 86 is actuated by means of a shifter fork 90 having its hub fixed to a piston 91 whose opposite ends are slidably mounted in cylinders 92 provided therefor in the bottom of the housing 2. As shown in Fig. 35, the clutch sleeve 86 is clutched with the spindle gear S by means of oil pressure supplied to the left hand cylinder by means of a pipe 94; and the piston is shifted in the opposite direction to cause the spindle to rotate with the double gear O, Q by means of oil supplied to the right-hand cylinder through a pipe 95.

Figure 2:
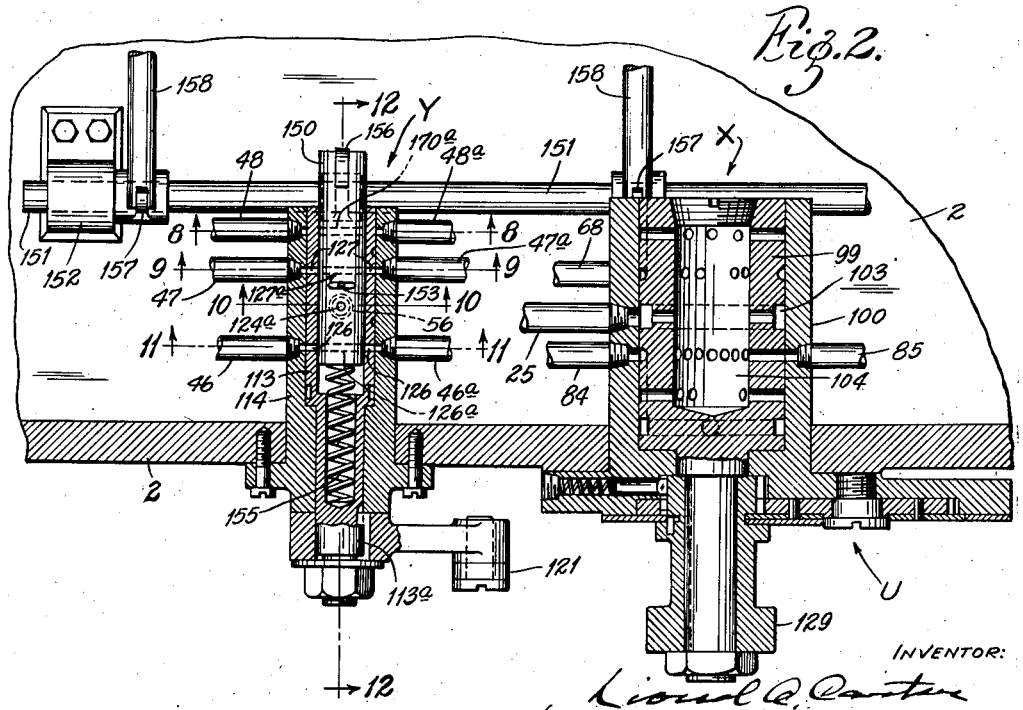

The hereinbefore described arrangement of shafts, clutches and gears provides sixteen forward and eight reverse spindle speeds which are obtained by a corresponding number of angular adjustments of a single rotary control valve X which controls the flow of oil to the operating cylinders for the clutches A, A', B, C and D, but not to the operating cylinders for the reverse drive clutch A" or the brake mechanisms E and E'. As shown in Figs. 1 and 2, the control valve X comprises a core 99 that is rotatably mounted in a casing 100 mounted in the front wall of the headstock 2. As shown in Fig. 35, the oil is supplied to the control valve through the pipe 25 leading from the pump 20. As shown in Fig. 2, oil flowing through the pipe 25 from the pump 20 enters an annular groove 103 in the periphery of the valve core 99 and thence passes into a chamber 104 where it is delivered to the forward drive clutches A, A', B, C and D through the different pipes hereinbefore referred to. This control valve is shown and fully described in my copending application Serial No. 721,974 and reference is hereby made to such description.

The core 99 of the speed control valve X is provided with an operating knob 129; and the rotary movement of said valve core operates suitable devices U and U' mounted on the head stock and carriage apron, respectively, for setting said valve to obtain the approximate circumferential cutting speed required for the work and for indicating and checking said speed. This setting and indicating device is claimed and fully described in my copending application Serial No. 721,974 and reference is hereby made to such description.

The above change speed transmission is started, stopped and reversed and the countershaft brake E and the spindle brake E' are controlled by means of a manually operable valve Y that controls the flow of oil through the pipes 46, 47 and 48 leading to the friction clutches A, A' and A" and the pipes 56 and 56a leading to the brake mechanisms E and E'. Said valve comprises a cylindrical valve sleeve 113 rotatable in a casing 114 that is mounted in the front side wall of the headstock housing 2 adjacent to the control valve X. The cylindrical valve sleeve 113 is preferably rotated by means of a handle 115 that is fixed to a rock shaft 116 journaled in the bearings 117 and 118 provided therefor in the lathe bed 1 and the carriage apron 119, respectively, and is provided with an arm 120 that has a link connection 121 with an arm fixed to an axial stud 113a on the closed outer end of said valve sleeve 113.

As shown in Figs. 10 to 10d and 35 the pipe 25 leading from the pump 20 to the speed control valve X has a branch 25a adapted, in the off or stop position of the stop-forward-and-reverse valve Y, to communicate through diametral ports 124 and 124a, respectively, in the valve sleeve 113 and a core 150 therein with the pipe 56 that leads to the brake operating mechanism E and has the branch 56a that leads to the brake operating mechanism E'. As shown in Figs. 11 to 11d, said sleeve and core are also provided with diametral ports 126 and 126a, respectively, adapted to establish communication between said speed control valve and the primary clutch A through the pipes 46 and 46a. As shown in Figs. 9 to 9d, said sleeve and core are also provided with diametral ports 127 and 127a, respectively, adapted to establish communication with the speed control valve and the primary clutch A' through the pipes 47 and 47a. As shown in Figs. 8 to 8d, said sleeve and core are also provided with diametral ports 170 and 170a, respectively, adapted to establish communication between the pipe leading from the valve Y to the reverse clutch A" and a pipe 48a leading from the pipe 25 to said valve at a point diametrically opposite the point of communication of the pipe 48 therewith. The outer periphery of the valve sleeve is provided with a longitudinal exhaust groove 128 adapted, in the stop or off position of the valve Y, to be brought into communication with the pipes 46 and 47 leading to the operating cylinders of the primary friction clutches A and A', respectively, and the pipe 48 leading to the operating cylinders of the reverse drive clutch.

When the valve Y is in forward drive position, as shown in Figs. 8, 8a and 8b, 9, 9a and 9b, 10, 10a and 10b, and 11, 11a and 11b, the pipes 56, 56a leading to the braking mechanism E and E' are cut off from the pipe 25a (see Figs. 10, 10a and 10b), thus releasing said brakes; communication is established between the speed control valve X and the clutch A through the ports 126, 126a (see Figs. 11, 11a and 11b) and between said control valve and the clutch A' through the ports 127, 127a (see Figs. 9, 9a and 9b) and one of said clutches is engaged and the other released, depending upon the position of the control valve X; and the pipe 48 leading to the reverse clutch A" is cut off from the pipe 48a leading from the pipe 25 (see Figs. 8, 8a and 8b), thereby leaving said reverse drive clutch in inoperative position. When the valve Y is rotated to stop or off position, as shown in Figs. 8c, 9c, 10c and 11c, flow of the oil to the clutches A, A' and A" is cut off and the pipes 46, 47 and 48 are open to the atmosphere (see Figs. 11c, 9c and 8c, respectively) through the exhaust port 128, thereby relieving the pressure on each of said clutches and thus preventing operation thereof; and oil is supplied to the brake mechanisms E and E' to apply the brakes to the countershaft 8 and spindle 10 (see Fig. 10c) through the pipe 25a, ports 124, 124a and pipes 56 and 56a. When the valve Y is in reverse drive position, as shown in Figs. 8d, 9d, 10d and 11d, the pipes 56, 56a leading to the brake mechanisms E and E' are cut off from the pipe 25a (see Fig. 10d), thus releasing said brakes; communication is established between the pipe 25 and the reverse drive clutch A" through the pipe 48a, ports 170, 170a and pipe 48 (see Figs. 8d and 35) to engage said reverse clutch; and the flow of oil to the two clutches A and A' is cut off and the pipes 46 and 47 are open to the atmosphere (see Figs. 11d and 9d, respectively) through the exhaust port 128 thereby preventing operation of these two clutches.

With the fluid operated change speed mechanism thus far described, the operator is liable to manipulate the speed control valve X to effect speed changes while the valve Y is in forward or reverse drive position, thereby causing clashing of the positive clutches B, C and D and consequent damage to the transmission. Accordingly, means are provided for enabling the desired speed changes to be quickly, easily and safely made without requiring the valve Y to be manually moved to stop position. Said means comprises a horizontal rock shaft 151 (see Figs. 2 and 12) journaled in suitable bearings 152 provided therefor in the bottom of the headstock housing 2 and extending longitudinally of said housing below the inner end of the valve Y and opposite the three fluid operated positive clutch mechanisms B, C and D. The core 150 of the valve Y is axially slidable but non-rotatably mounted in the rotary valve sleeve 113 and is provided with a diametral port 153, which is located between the two diametral ports 124a and 127a, and with a longitudinal peripheral exhaust groove 154 that extends (see Fig. 18) from a point located near the innermost diametral ports 126a to the outer end of said core. A helical compression spring 155 is located in said sleeve between the inner end of its bore and the adjacent end of said core so as to force the core outwardly in said bore. Fixed to the rock shaft 151 is an upright arm 156 (see Fig. 12) whose free upper end is engaged by the outer end of the spring pressed valve core 150. The rock shaft has separate connections with the fluid operated positive clutch mechanisms A, B and C. Each of said connections comprises an upwardly extending rock arm 157 fixed to the rock shaft with its upper end bearing against the adjacent end of a slide rod 158, which is slidably supported in a bracket 159 (see Fig. 23) provided therefor in the housing 2 and has its other end rounded and disposed in abutting relation to a cam 160 formed on the opposing peripheral face of the hub of the clutch shifter fork of the particular clutch mechanism. As shown in Fig. 14, this cam extends from end to end of the hub and comprises end steps 161, intermediate steps 162 and a middle or top step 163. With this construction of cam, when any one of the positive clutches is engaged with the gear member at either end thereof, the rod 158 is engaged with one of the end steps 161 of the cam and the core 150 of the valve Y is in the outermost of its three longitudinal movable positions. In this outermost longitudinal position of the core 150 of the valve Y, as shown in Figs. 2 and 12, the parts are in the position shown in Figs. 8, 9, 10 and 11 in the forward drive position of the rotary valve sleeve, in the positions shown in Figs. 8c, 9c, 10c and 11c in the stop or off position of said valve sleeve, and in the positions shown in Figs. 8d, 9d, 10d and 11d in the reverse drive position of said valve sleeve, and all of the fluid operated clutches of the transmission are under the control of the main control valve X. With the parts in this position, operation of said control valve to effect a speed change actuates at least one of the positive clutch devices A, B and C and causes the stepped cam 160 on the hub of the shifter fork of said clutch device to move across the end of the rod 158 associated therewith and bring the intermediate step 162 of said cam into engagement with said rod before the clutch is disengaged, thereby moving the valve core 150 axially in the valve sleeve 113 to the position shown in the second cross-sections of Figs. 8a, 9a, 10a and 11a. In this position of the valve core 150, the pipes 46, 47 and 48 leading to the friction clutches A, A' and A", respectively, are in communication with the atmosphere through the longitudinal groove 154 and said clutches are automatically disengaged, thereby relieving the positive clutch of driving torque and thus facilitating disengagement thereof. After a relatively short movement of the cam 160, the middle step 163 thereof shifts the core 150 endwise into its farthest innermost position, as shown in Figs. 8b, 9b, 10b and 11b. In this position of the valve core 150, the three friction clutches are still disengaged (see Figs. 8b, 9b and 11b); and the pipe 25a is placed in communication, with the pipe 56 leading to the brake mechanisms E and E' through the ports 124 and 153 (see Fig. 10b) so that pressure is applied to said brake mechanism to apply the brake 49 to the countershaft 8 and the brake 57 to the spindle or final drive shaft 10 in the completely disengaged position of the positive clutch. Continued movement of the cam 160 in the same direction causes the other intermediate step 162 to engage the rod 158 and disengage the brake 49 before the other end of the positive clutch engages with the gear adjacent thereto; and the friction clutches A, A' and A'' have enough drifting action to revolve said gear at a relatively low speed and with slight torque, thereby facilitating the re-engagement of the positive clutch. When the positive clutch is re-engaged, the rod 158 is in contact with the other end step 162 and the core 150 is moved to the longitudinal position shown in Figs. 8, 8c and 8d, 9, 9c and 9d, 10, 10c and 10d, and 11, 11c and 11d to again throw in the friction clutches.

In the stop position of the valve Y, as shown in Figs. 8c, 9c, 10c and 11c, the pipes 46, 47 and 48 are placed in communication with the atmosphere through the exhaust port 128, thereby releasing the three friction clutches, and the pipe 25a is placed in communication with the pipe 56 through the registering ports 124 and 124a, thereby permitting the fluid pressure to reach the cylinder 51 and apply the brake 49. If, in this stop position of the valve Y, the control valve X is actuated to set the transmission mechanism for a different speed, the movement of the cam 160 associated with the selected positive clutch will release the brake 49 while said clutch is being disengaged from one gear, apply the brake after the clutch is completely disengaged, and again release the brake while the clutch is being engaged with the other gear which is slowly rotated by the drifting action of the friction clutches and thus facilitates the engagement of the clutch therewith. The brake is released during the disengaging and engaging movements of the positive clutch by the intermediate steps 162 of the cam 160 which cause the valve core 150 to slide axially in the valve sleeve 113 and cut off communication between the pipes 25a and 56. Application of the brake during the release position of the positive clutch is brought about by the middle step 163 of the cam 160 which shifts the valve core axially to bring the port 153 therein in register with the ports 124 and thus establishes communication between the pipes 25a and 56.

To facilitate engagement and disengagement of the positive clutches B, C and D it is desirable to effect a relatively fast movement of the clutches from engaged to disengaged position and a relatively slow movement after disengagement to permit effective and easy functioning of the brake until they are disengaged and the brake is applied. Accordingly, the piston of each positive clutch device (see Figs. 13 and 14) is provided near each end with an annular groove 164 and between said annular groove and the adjacent end of said piston with a portion 165 of less diameter than the intermediate portion of the piston. Each end of the piston is also provided with ports 166, which communicate at their inner ends with the annular groove 164 and at their outer ends with the space between the end of the cylinder and the end of the piston. An annular groove 167 is also provided at the inner periphery of each cylinder in communication with the pipe leading thereto. With this arrangement, with the parts in the position shown in Fig. 13, the clutch B is disengaged from the gear M by oil supplied through the pipe 68 to the groove 167 in the piston and thence around the reduced end portion 165 of the piston and through the ports 166 to the space between the corresponding ends of the piston and cylinder, thereby causing the piston to move rapidly to the right and quickly disengage the clutch B. Upon disengagement of the clutch, the reduced end portion 165 of the piston arrives opposite the annular groove 167 in the cylinder, thus cutting down the supply of fluid to the end of the cylinder and causing the piston to travel very slowly while the brake is being applied. This slow movement of the piston continues until the opposite end of the clutch engages the gear K, at which time the reduced end portion 165 of the piston clears the annular groove 167 and the pipe 68 opens directly into the cylinder thus imparting a rapid movement to the piston and bringing about a quick engagement of said clutch with said gear.

Since the friction clutches A and A' cannot be operated until the positive clutches B, C and D are well engaged, (see Figs. 9a and 11a) a condition sometimes arises when the teeth of the slidable element of a positive clutch are disposed directly opposite and in endwise abutting relation to the teeth of its mating element and thus prevent engagement of said elements. To overcome this condition the outer periphery of the rotary sleeve 113 of the valve Y is provided adjacent to the ports 126 and 127 with grooves forming semiannular by-pass ports 126b and 127b, respectively. As shown in Figs. 9 to 9d, 11 to 11d, 16 and 19, the ends of the by-pass port 126b are diametrically opposed and are located in the plane of the port 126 but are offset 30° with respect thereto; and the ends of the diametrically opposed ends of the semiannular ports 127a are also arranged in the same manner with respect to the ports 127. With this arrangement, when difficulty is experienced in engaging any one of the positive clutches due to the condition above described, the valve Y is rotated thirty degrees beyond the forward drive position, thus establishing communication between the pipes 47 and 47a or 46 and 46a around the valve core 150 through the by-pass port 126b or 127b, depending upon which one of the two forward drive clutches is being used, thus by-passing fluid to the forward drive clutches A and A', and thereby permitting the sliding clutch element to rotate with respect to its mating element until it reaches a position that will permit engagement of said clutch elements. As shown in Fig. 15, the over-travel or rotary movement of the valve Y beyond its forward drive position is against a spring-pressed plunger 171 that is slidably mounted in a housing 172 provided therefor in the bracket 118 which supports the rod 116 for actuating said valve, the spring-pressed plunger being arranged with its outer end in abutting relation to the handle 115 by which said rod is rotated.

As shown in Figs. 22 to 35, inclusive, the fluid pressure system includes a valve Z for disengaging the positive clutch D so as to permit turning of the spindle 10 by hand to chuck or set up a piece of work. As shown in Fig. 35, this spindle release valve is located in the pipes 94 and 95 that connect the control valve X with the pair of cylinders 92 for the piston that operates the clutch sleeve 86 of the positive clutch D, which connects the spindle 10 with either the double gear O, Q or the gear S. The spindle release valve Z comprises a casing 173 mounted in the front wall of the headstock housing 2 opposite the clutch shifter fork 90 of the positive clutch mechanism D and a valve member or core 174 rotatably mounted in said casing and provided at its outer end with an operating handle 174a. The core of the spindle release valve is provided with longitudinally spaced diametral ports 175 and 176 adapted, in the normal or inoperative position of said valve, to permit flow of the fluid through the pipes 94 and 95, respectively. As shown in Fig. 34, the periphery of the valve core 174 is also provided on opposite sides with two semi-annular, reversely arranged substantially Z-shaped grooves, forming by-pass ports 177 and 178, whose corresponding ends are diametrically opposed one on each side of the adjacent diametral port ninety degrees therefrom. With this arrangement, when the core 174 of the spindle release is rotated ninety degrees to the right or left, depending upon whether the clutch sleeve 86 is engaged with the gear O or gear S, the diametral ports 175 and 176 are cut off from the pipes 94 and 95, respectively, (see Figs. 30a, 31a and 32a) and each of the by-pass ports is brought into communication at one end with the pipe 94 and at the other end with the pipe 95, thereby cross-connecting said pipes and thus balancing the pressures in the two cylinders which causes the clutch sleeve 86 to move to neutral position and releases the spindle 10 so that it may be freely rotated by hand.

The rotary valve or core member 174 of the spindle release valve Z is yieldably held in normal position, that is, with its diametral ports 175 and 176 in register with the pipes 94 and 95, respectively, by means of a pair of spring-pressed plungers 179 that are axially slidable in radial bores provided therefor in the outer end of the valve casing 173, one on each side of a squared portion 174b of said valve core. These spring-pressed plungers have their valve core engaging ends 179a disposed parallel to each other but at an oblique angle to their axes; and these oblique ends bear flatwise against the flat opposite sides of the squared portion 174b of said valve core and thus serve to yieldably hold the same in normal or inoperative position. The valve sleeve is provided with a radial opening 180 disposed opposite an annular groove 181 formed by a reduced portion of the valve core 174, whereby any oil that leaks around the valve core will be discharged into the interior of the headstock housing instead of escaping from the outer end of the valve.

When the sleeve 86 of the spindle clutch is moved to a neutral position by means of the spindle release valve Z, there is a tendency for said sleeve to move too far and engage the gear facing its direction of movement. This overtravel of the clutch sleeve during the balancing of the pressures in the two clutch operating cylinders is arrested by means of a mechanical connection between the clutch shifter fork 90 and the rotary core 174 of the spindle release valve. This connection comprises an eccentrically disposed pin 182 on the inner end of said valve core adapted, when said core is rotated ninety degrees in either direction from its normal position to lie in the path of either one of a pair of lugs 193, 193a, (see Figs. 24 to 27) formed on a plate 194 that is rigidly fixed for movement with the clutch shifter arm 90. In the normal position of the spindle release valve (see Fig. 25), the lugs 193, 193a are disposed one above and at one side of the eccentric pin 182 and the other below and on the other side of said pin so as to clear said pin during the operation of the clutch shifter fork 90. When, however, the valve core 174 is rotated ninety degrees to the right or left, the eccentric pin 182 is moved into the path of one of said lugs in position to be engaged thereby during the overtravel of the clutch sleeve during its disengaging movement, thereby rotating the valve core far enough (see Figs. 30b and 32b) to cause the fluid to again resume its normal flow through the pipes 94 or 95 by way of the circumferential extensions 175a and 176a and ports 175 or 176, thus momentarily applying additional pressure to one of the cylinders 92 to arrest the overtravel of said clutch sleeve. The spring-pressed plungers 179 then come into action and rotate the valve core 174 in a reversed direction to the position shown in Figs. 30a, 31a and 32a to again equalize the pressure in the two cylinders, thus holding the clutch sleeve in neutral position until the spindle release valve is returned to normal position.

Fig. 3a illustrates a modified construction showing how the various speed changes may be obtained by means of sliding gears instead of the positive clutches B, C and D. In this construction, the rear section 9' of the sectional countershaft has a double gear slidably splined thereon that is shifted longitudinally of the shaft into mesh with the gear L' or J' on the countershaft 0' by means of a clutch shifter fork 64' fixed to a piston 65' supported at its ends in cylinders 66' that are supplied with fluid through the pipes 67' and 68'.

The hereinbefore described fluid operated change speed transmission has numerous advantages. It locates the reverse drive clutch on the same shaft with the two forward drive clutches and thus dispenses with the necessity for an additional shaft for said clutch; and it enables said clutch to be controlled by the same valve that is used for starting and stopping the mechanism. It also provides means under the control of said valve for facilitating the engagement of the co-operating elements of the positive clutches. The spindle brake prevents over-running of the spindle and is automatically released during the engaging and disengaging movements of the selective positive clutch and is automatically applied in the complete disengaged position of said clutch. The spindle release valve permits the spindle clutch to be quickly and easily shifted to neutral position so as to permit easy rotation of the spindle for chucking; and the connection between said clutch and said valve prevents over-travel of the clutch during its movement over its engaged position and thus prevents its engagement with the gear facing its direction of travel.

Obviously, numerous changes may be made without departing from the invention. Therefore, I do not wish to be limited to the precise construction shown and described.

What I claim is:

1. In a change speed transmission having a forward drive clutch and a reverse drive clutch, a fluid pressure system including fluid pressure devices for operating the respective clutches, a valve in said system for operating said forward drive clutch, and a second valve in said system between said forward drive clutch and said control valve for preventing operation of said forward and reverse drive clutches and for rendering them selectively operative.

2. In a change speed transmission having a primary forward drive clutch, a primary reverse drive clutch and a secondary clutch, a fluid pressure system including fluid pressure actuated devices for the respective clutches, a single control valve for selectively operating the fluid pressure actuated devices for said primary forward drive and secondary clutches, and a second valve located in said system between said primary forward drive clutch and said control valve for rendering said primary forward and reverse drive clutches inoperative or selectively operative.

3. In a change speed transmission having a primary forward drive clutch, a primary reverse drive clutch and a secondary clutch, a fluid pressure system including fluid pressure actuated devices for the respective clutches, a single control valve for selectively operating the fluid pressure actuated devices for said forward drive and secondary clutches, and a second valve located in said system between said primary forward drive clutch and said control valve for preventing operation of said primary forward and reverse drive clutches, said second valve having three positions, one for the forward drive, one for the reverse drive and one for stopping.

4. In a change speed transmission having a forward drive clutch and a reverse drive clutch, a fluid pressure system including fluid pressure actuated devices for operating the respective clutches, a single control valve for selectively operating the fluid pressure actuated devices for said forward drive and secondary clutches, a plurality of fluid operated brakes for said transmission, and a second valve located in said system between said forward drive clutch and said control valve for preventing operation of one or the other or both of said forward and reverse clutches and for bringing about the application of said brakes at the same time.

5. In a change speed transmission having a plurality of primary forward drive clutches and a primary reverse drive clutch, a plurality of secondary clutches, and a control member for selectively operating said forward drive and secondary clutches, a forward, reverse and stop device adapted in the stop position to prevent operation of said primary and reverse drive clutches, and means arranged to permit disengagement of said primary forward and reverse drive clutches when said control member is operated in the forward and reverse positions of said forward, reverse and stop device to disengage any one of said secondary clutches.

6. In a change speed transmission having a primary forward drive clutch, a secondary clutch, a primary reverse drive clutch, a control member for selectively operating said primary forward drive and secondary clutches, a forward, reverse and stop device adapted in the stop position thereof to prevent operation of said primary, forward and reverse drive clutches, and means arranged to permit disengagement of said primary forward and reverse drive clutches when said control member is operated in the forward and reverse positions of said forward, reverse and stop device to disengage said secondary clutch.

7. In a change speed transmission having fluid operated primary forward and reverse drive clutches, a fluid operated secondary clutch, a control valve for selectively operating said forward drive and secondary clutches, a forward, reverse and stop valve adapted in the stop position thereof to prevent operation of said primary forward and reverse drive clutches, and means associated with said forward, reverse and stop valve to automatically disengage said primary forward and reverse drive clutches when the secondary clutch is being actuated in the forward and reverse positions of said forward, reverse and stop valve.

8. In a change speed transmission having a fluid operated forward drive clutch, a fluid operated reverse drive clutch and a fluid operated positive clutch, a control valve for selectively operating said forward drive and positive clutches, a manually operable forward, reverse and stop valve adapted in the stop position thereof to prevent operation of said forward and reverse drive clutches, and means associated with and operable in the start position of said forward, reverse and stop valve to automatically disengage said forward and reverse drive clutches when said positive clutch is being actuated by said control valve.

9. In a change speed transmission having fluid operated primary forward and reverse drive clutches, a fluid operated secondary clutch, a plurality of fluid operated brakes, a manually operable control valve for selectively operating said forward drive and secondary clutches, a manually operable forward, reverse and stop valve adapted in the stop position thereof to bring about the application of said brakes and the disengagement of said primary clutches, and means whereby the operation of said secondary clutch by said control valve in the forward and reverse positions of said forward, reverse and stop valve will bring about the disengagement of said primary clutches while the secondary clutch is being engaged and disengaged and when it is disengaged and will cause the brakes to be applied when the secondary clutch is completely disengaged.

10. In a change speed transmission having fluid operated primary forward and reverse drive clutches, a fluid operated secondary clutch, a manually operable control valve for selectively operating said forward drive and secondary clutches, a manually operable forward, reverse and stop valve adapted in the stop position thereof to prevent operation of said primary clutches, and means whereby when the secondary clutch is actuated by the control valve in the forward and reverse drive positions of the forward, reverse and stop valve the movement of the secondary clutch will bring about the disengagement of the primary clutches when the secondary clutch is disengaged and while it is being engaged and disengaged.

11. In a change speed transmission having fluid operated friction primary forward and reverse drive clutches, a fluid operated double acting positive secondary clutch arranged between and adapted to be interlocked with either one of two elements of said transmission, a plurality of fluid operated brakes, a control valve for selectively operating said forward drive and secondary clutches, a forward, reverse and stop valve adapted in the stop position thereof to bring about the application of said brakes and the disengagement of said forward and reverse drive friction clutches, means whereby the operation of said positive clutch by said control valve in the forward and reverse drive positions of said forward, reverse and stop valve will bring about the disengagement of the forward and reverse drive friction clutches while the positive clutch is being engaged and disengaged and when it is disengaged and will cause the brakes to be applied when the positive clutch is completely disengaged, and means for causing a relatively rapid movement of said positive clutch when it is being engaged and disengaged with either of the elements associated therewith and a relatively slow movement while it is moving from one element to the other.

12. In a change speed transmission having fluid operated primary forward and reverse drive clutches, a fluid operated positive secondary clutch, a control valve for selectively operating said forward drive and secondary clutches, a forward, reverse and stop valve adapted in the stop position thereof to prevent operation of said primary forward and reverse drive clutches, and a core axially slidable in said forward, reverse and stop valve and arranged in the forward and reverse drive positions thereof to cause disengagement of said primary forward and reverse drive clutches while said positive clutch is being engaged and disengaged and when it is disengaged.

13. In a change speed transmission having fluid operated primary forward and reverse drive clutches, a fluid operated positive secondary clutch, a control valve for selectively operating said forward drive and secondary clutches, fluid operated brakes, a manually operable forward, reverse and stop valve adapted in the stop position thereof to prevent operation of said primary forward and reverse drive clutches, and a core axially slidable in said forward, reverse and stop valve and arranged in the forward and reverse drive positions thereof to cause disengagement of said forward and reverse drive clutches while said positive clutch is being engaged and disengaged and when it is disengaged, and to apply said brakes in said disengaged position of said positive clutch.

14. In a change speed transmssion having fluid operated primary forward and reverse drive clutches, a fluid operated positive secondary clutch, fluid operated brakes, a control valve for operating said forward drive and secondary clutches, a forward, reverse and stop valve adapted in the stop position thereof to prevent operation of said forward and reverse drive clutches, and a core axially slidable in said forward, reverse and stop valve and arranged in the forward and reverse positions of the forward, reverse and stop valve to cause disengagement of said forward and reverse drive clutches while said positive clutch is being engaged and disengaged and when it is disengaged, and to apply said brakes in such disengaged position of said positive clutch, said core being also arranged in the stop position of said forward, reverse and stop valve to cause the release of said brakes when said positive clutch is being engaged and disengaged, and a cam movable with said positive clutch and operatively connected to said core to actuate the same.

15. In a change speed transmission having fluid operated primary forward and reverse drive clutches, a fluid operated positive secondary clutch, fluid operated brakes, a control valve for operating said forward drive and secondary clutches, a forward, reverse and stop valve adapted in the stop position thereof to prevent operation of said forward and reverse drive clutches, and a core axially slidable in said forward, reverse and stop valve and arranged in the forward and reverse positions of the forward, reverse and stop valve to cause disengagement of said forward and reverse drive clutches while said positive clutch is being engaged and disengaged and when it is disengaged, and to apply said brakes in such disengaged position of said positive clutch, said core beng also arranged in the stop position of said forward, reverse and stop valve to cause the release of said brakes when said positive clutch is being engaged and disengaged, and a cam movable with said positive clutch and operatively connected to said core to actuate the same, the operative connection between said cam and said core comprising a rod arranged to be shifted axially by said cam, a rock shaft extending transversely of said core, an arm fixed to said shaft and connected to said rod, an arm fixed to said shaft with its free end disposed opposite to the outer end of said core, and a spring for holding said core in engagement with said last mentioned arm.

16. In a change speed transmission having fluid operated primary forward and reverse drive clutches, a fluid operated secondary clutch, a control valve for selectively operating said forward drive and secondary clutches, a forward, reverse and stop valve adapted in the stop position thereof to prevent operation of said forward and reverse drive clutches, means associated with said forward, reverse and stop valve to automatically disengage said forward and reverse clutches when the secondary clutch is being actuated in the forward and reverse drive positions of said forward, reverse and stop valve, and means also associated with said last mentioned valve for engaging said forward and reverse drive clutches during the engaging movement of said secondary clutch to facilitate such engagement.

17. In a change speed transmission having a fluid operated primary clutch, a fluid operated positive secondary clutch, a start and stop valve adapted in the position to prevent operation of said primary clutch by said control valve, means associated with said start and stop valve to automatically disengage said primary clutch when the secondary clutch is being actuated in start position of said start and stop valve, and means also associated with said last mentioned valve for engaging said primary clutch during the engaging movement of said secondary clutch to facilitate such engagement.

18. In a change speed transmission having fluid operated primary forward and reverse drive clutches, a fluid operated positive secondary clutch, a control valve for selectively operating said forward drive and secondary clutches, a forward, reverse and stop valve adapted in the stop position thereof to prevent operation of said primary forward and reverse drive clutches, a core axially slidable in said forward, reverse and stop valve and arranged in the forward and reverse drive positions thereof to cause disengagement of said primary forward and reverse drive clutches while said positive clutch is being engaged and disengaged and when it is disengaged, and means whereby said valve may be operated during the engaging movement of said positive clutch to engage said forward and reverse drive clutches.

19. A change speed transmission having a plurality of disengageable fluid pressure actuated change speed power transmission devices, a fluid pressure system for operating said devices, a control valve in said system for operating said change speed fluid pressure actuated power transmission devices, and a second valve in said system for rendering either or both of said fluid pressure actuated forward and reverse drive power transmission devices inoperative by said control valve.

20. A change speed mechanism having a plurality of disengageable, pressure actuated, change speed, primary and secondary power transmission devices, a disengageable, primary reverse drive, pressure actuated, power transmission device, a fluid pressure system for selectively operating all of said change speed devices, a single control valve in said system, and a second valve in said system for rendering either or both of said primary change speed fluid pressure actuated power transmission devices operative or inoperative.

21. A change speed mechanism having a primary shaft and a countershaft, two forward drive clutches and a reverse drive clutch on said primary shaft, a plurality of clutches on said countershaft, and a fluid pressure system for operating said clutches, said system including a single control valve for selectively operating the two forward drive clutches on said primary shaft and the clutches on said countershaft.

22. A change speed mechanism having a primary shaft and a countershaft, two forward drive clutches and a reverse drive clutch on said primary shaft, a plurality of clutches on said countershaft, and a fluid pressure system for operating said clutches, said system including a single control valve for selectively operating the forward drive primary shaft clutches and the countershaft clutches, and a second valve in said system for preventing operation of said primary shaft clutches.

23. A change speed mechanism having a primary shaft and a countershaft, two forward drive clutches and a reverse drive clutch on said primary shaft, a plurality of clutches on said countershaft, and a fluid pressure system including a single control valve for selectively operating said forward drive primary shaft clutches and said countershaft clutches, and a second valve in said system for rendering the three primary clutches inoperative, said valve having three positions, one for cutting off communication between said control valve and said forward drive primary shaft clutches and for cutting off the reverse drive primary shaft clutch, one for establishing communication between the two forward drive primary shaft clutches and said control valve, and one for establishing communication between the reverse drive primary shaft clutch and said fluid pressure system.

24. A change speed mechanism having a primary shaft and a final drive shaft, a clutch on said primary shaft, a clutch on said final drive shaft, a fluid pressure system including fluid pressure actuated devices for operating the respective clutches, a single control valve for selectively operating said fluid pressure actuated devices, a brake for said primary shaft, a brake for said final drive shaft, and a second valve located in said system between said primary shaft clutch and said control valve for preventing operation of said primary shaft clutch by said control valve and for bringing about the application of said primary and final drive shaft brakes at the same time.

25. A change speed transmission having a final drive shaft, a clutch on said shaft, a fluid pressure system including a fluid pressure actuated device for operating said clutch, a control valve for operating said device, said device including a piston operable by pressure supplied to either end thereof through said control valve, and a second valve located in said fluid pressure system between said control valve and said piston for transferring such pressure to either end of said piston and thus move the clutch to neutral position.

26. A change speed transmission having a final drive shaft, a clutch on said shaft, a fluid pressure system including a fluid pressure actuated device for operating said clutch, a control valve for operating said device, said device including a piston operable by pressure supplied to either end thereof through said control valve, and a second valve located in said fluid pressure system between said control valve and said piston and including a rotary core adapted in one position to permit pressure to be applied to either end of said piston and to relieve the pressure on the other end thereof according to the position of said control valve, and in two other positions to switch such pressure to either end of said piston and to relieve the pressure on the other end thereof to move the clutch to neutral position.

27. A change speed transmission having a shaft, a double acting clutch on said shaft, a fluid pressure system including a fluid pressure actuated device for shifting said clutch in opposite directions, and control valve for said device, said device including a piston operable by pressure supplied to either end thereof through said control valve, and a clutch release valve located in said fluid pressure system between said control valve and said piston and including a core adapted in first or normal position to permit pressure to be applied to either end of said piston and to relieve the pressure on the other end thereof according to the position of said control valve and in two other or second positions to switch the pressure to either end of said piston and to relieve the pressure on the other end thereof.

28. A change speed transmission having a shaft, a double acting clutch on said shaft, a fluid pressure system including a fluid pressure actuated device for shifting said clutch in opposite directions and control valve for said device, said device including a piston operable by pressure supplied to either end thereof through said control valve, and a clutch release valve located in said fluid pressure system between said control valve and said piston and including a core adapted in first or normal position to permit pressure to be applied to either end of said piston and to relieve the pressure on the other end thereof according to the position of said control valve and in two other or second positions to switch the pressure to either end of said piston and to relieve the pressure on the other end thereof, and an operative connection between said piston and said valve core adapted, during the movement of said clutch beyond neutral position, to move said core to either of two third positions wherein pressure corresponding to the pressure brought about by said first position of said core are restored to return said clutch to neutral position.

29. A change speed transmission having a shaft, a double acting clutch on said shaft, a fluid pressure system including a fluid pressure actuated device for shifting said clutch in opposite directions and a control valve for said device, said device including a piston operable by pressure supplied to either end thereof through said control valve, and a clutch release valve located in said fluid pressure system between said control valve and said piston and including a rotary core adapted in first or normal position to permit pressure to be applied to either end of said piston and to relieve the pressure on the other end thereof according to the position of said control valve and in two other or second positions to switch the pressure to either end of said piston and to relieve the pressure on the other end thereof, and an operative connection between said piston and said valve core adapted by overtravel of said clutch during the movement thereof to neutral position to move said core to either of two third positions wherein pressure corresponding to the pressure brought about by said first position of said core are restored to resist said overtravel, said connection comprising an eccentric pin on said rotary valve core and spaced lugs movable with said clutch, the eccentric pin being out of the path of travel of said lugs in the first or normal position of said rotary valve core, the eccentric pin in one of said second positions of said rotary valve core being in the path of travel of one of said lugs and in the other second mentioned positions of said valve core being in the path of travel of the other of said lugs, whereby one of said lugs is adapted during the movement of said clutch beyond neutral position to abut against said eccentric pin and rotate said valve core to one of said third positions, and spring means for returning said valve to either of said two second positions.

LIONEL A. CARTER.